US009106556B2

(12) United States Patent
Khera et al.

(10) Patent No.: US 9,106,556 B2
(45) Date of Patent: Aug. 11, 2015

(54) METHOD TO ACHIEVE THE USE OF AN EXTERNAL METRIC AS THE PRIMARY TIE-BREAKER IN INTERMEDIATE SYSTEM TO INTERMEDIATE SYSTEM (ISIS) ROUTE SELECTIONS

(71) Applicant: Avaya Inc., Basking Ridge, NJ (US)

(72) Inventors: Gautam Khera, Walpole, MA (US); Ludovico Stevens, La Roquette-sur-Siagne (FR); Srikanth Keesara, Tewksbury, MA (US)

(73) Assignee: AVAYA INC., Basking Ridge, NJ (US)

( * ) Notice: Subject to any disclaimer, the term of this patent is extended or adjusted under 35 U.S.C. 154(b) by 188 days.

(21) Appl. No.: 13/763,840

(22) Filed: Feb. 11, 2013

(65) Prior Publication Data

US 2014/0226490 A1    Aug. 14, 2014

(51) Int. Cl.
*H04L 12/26* (2006.01)
*H04L 12/721* (2013.01)

(52) U.S. Cl.
CPC ..................................... *H04L 45/12* (2013.01)

(58) Field of Classification Search
CPC ........................................................ H04L 45/12
USPC ........................................ 370/229, 235, 238
See application file for complete search history.

(56) References Cited

U.S. PATENT DOCUMENTS

| 7,535,828 | B2 * | 5/2009 | Raszuk et al. | 370/219 |
|---|---|---|---|---|
| 8,576,720 | B2 * | 11/2013 | Cugini et al. | 370/238 |
| 8,693,315 | B2 * | 4/2014 | Sathappan et al. | 370/220 |
| 8,718,062 | B2 * | 5/2014 | Cao et al. | 370/392 |
| 2006/0018326 | A1 * | 1/2006 | Yucel | 370/397 |
| 2012/0069740 | A1 * | 3/2012 | Lu et al. | 370/238 |
| 2013/0114595 | A1 * | 5/2013 | Mack-Crane et al. | 370/390 |
| 2013/0279323 | A1 * | 10/2013 | Allan | 370/225 |
| 2013/0301472 | A1 * | 11/2013 | Allan | 370/254 |
| 2014/0219105 | A1 * | 8/2014 | Sathappan et al. | 370/238 |

* cited by examiner

*Primary Examiner* — Chi H Pham
*Assistant Examiner* — Robert Lopata
(74) *Attorney, Agent, or Firm* — Anderson Gorecki & Rouille LLP

(57) ABSTRACT

A method, apparatus and computer program product for providing the use of an external metric as the primary tie-breaker in ISIS route selections is presented. A set of routes are identified that are to be advertised by the router as external routes within a network. The routes are advertised by the router using a Type Length Variable (TLV), wherein the TLV contains metric information to be used as a first tiebreaker when selecting routes. The network is running an Intermediate System To Intermediate System (ISIS) protocol. The TLV includes a 32-bit or a 64-bit administrative tag sub-TLV, the TLV comprising TLV#135, TLV#235, TLV#236, and TLV#237.

11 Claims, 4 Drawing Sheets

METHOD TO ACHIEVE THE USE OF AN EXTERNAL METRIC AS THE PRIMARY TIE-BREAKER IN INTERMEDIATE SYSTEM TO INTERMEDIATE SYSTEM (ISIS) ROUTE SELECTIONS

BACKGROUND

Open Shortest Path First (OSPF) is a link-state routing protocol for Internet Protocol (IP) networks. OSPF uses a link state routing algorithm and falls into the group of interior routing protocols, operating within a single autonomous system (AS). OSPF is an interior gateway protocol that routes Internet Protocol (IP) packets solely within a single routing domain (autonomous system). OSPF gathers link state information from available routers and constructs a topology map of the network. The topology determines the routing table presented to the Internet Layer which makes routing decisions based solely on the destination IP address found in IP packets.

OSPF detects changes in the topology, such as link failures, very quickly and converges on a loop-free routing structure quickly. OSPF computes the shortest path tree for each route using a shortest path first algorithm. The OSPF routing policies used to construct a route table are governed by link cost factors (external metrics) associated with each routing interface. Cost factors may be the distance of a router (round-trip time), network throughput of a link, or link availability and reliability, expressed as simple unitless numbers. This provides a dynamic process of traffic load balancing between routes of equal cost.

Another interior routing protocol is Intermediate System To Intermediate System (ISIS). ISIS is an interior gateway protocol, designed for use within an administrative domain or network. ISIS determines the best route for packets through a packet-switched network. ISIS is a link-state routing protocol, operating by reliably flooding link state information throughout a network of routers. Each ISIS router independently builds a database of the network's topology, aggregating the flooded network information. Like the OSPF protocol, ISIS computes the best path through a network. Packets are then forwarded, based on the computed ideal path, through the network to the destination.

Routing protocols like ISIS and OSPF use internal cost to the advertising router as the primary tie-breaker when making route selection decisions. When the same route is advertised by multiple routers, the route from the router that has the lowest internal cost (Layer 1 (L1) cost or internal gateway Protocol (IGP) cost) is accepted. Sometimes network operators may want route selection not to be based on the internal cost, but instead to be based on an externally defined cost metric that they control before the routes are injected into the IGP. One of the primary reasons to do this is to achieve consistent primary/backup destination behaviors for traffic going out of the network (through firewalls for example) irrespective of the topology or path costs internal to the network.

OSPF has a standard defined way for advertising routers to identify a route type as internal or external and for external routes using the external metric as the primary tie-breaker during route selection.

SUMMARY

Conventional mechanisms such as those explained above suffer from a variety of deficiencies. Currently OSPF has a standardized way to select routes based on external cost and is supported by most router vendors. Similar or identical support is not available using ISIS. Workarounds using route-policies and metric manipulations have drawbacks. Current commercial practice is to use route-policies on the receiving routers and/or manipulate the ISIS link metric to force route selections in a specific manner.

The use of route-policies on the receiving routers and manipulation of ISIS link metrics is not a true solution. Some of the problems associated with this conventional approach are that such an approach impacts more than just the routes that user might want to select based on external cost. Another problem associated with the above described conventional approach is that the approach requires configuration of route policies on all the receiving routers and requires prior knowledge of the system-id/IP address of the advertising routers to configure the route-policy. Yet another problem is that the conventional approach may require prior knowledge of the specific target routes for use in the route policies, in general requiring too much advance knowledge of route and router addresses makes a dynamic routing protocol less useful. Generally, the use of route-policies is heavy handed and cumbersome configuration wise.

Embodiments of the invention significantly overcome such deficiencies and provide mechanisms and techniques that provide an external metric as the primary tie-breaker in ISIS route selections. The presently described invention uses ISIS Type Length Variables (TLVs) and sub-TLVs that are already defined by the standard to make route selection decisions based on external cost.

In a first particular embodiment of a method for providing an external metric as a tie-breaker for ISIS route selection, the method begins with identifying a set of routes that are to be advertised by a router as external routes within a network. The method further includes advertising the routes by the router using a Type Length Variable (TLV), wherein the TLV contains metric information to be used as a first tiebreaker when selecting routes.

In a second particular embodiment of a method for using an external metric as a tie-breaker for ISIS route selection, the method includes receiving, at the router, route advertisements within a network. The method also includes determining for a route advertisement if a particular administrative sub-TLV is present in the route advertisement. When the particular administrative sub-TLV is present in the route advertisement then method includes using metric information in the TLV for the route as a first tie-breaker when selecting between routes. When the particular administrative sub-TLV is not present in the route advertisement then the method includes using internal ISIS Layer 1 (L1) cost as the first tie-breaker when making a route selection.

Other embodiments include a computer readable medium having computer readable code thereon for providing an external metric as a tie-breaker for ISIS route selection. The computer readable medium includes instructions for identifying a set of routes that are to be advertised by a router as external routes within a network. The computer readable medium further includes instructions for advertising the routes by the router using a TLV, wherein the TLV contains metric information to be used as a first tiebreaker when selecting routes.

In another particular embodiment the computer readable medium for using an external metric as a tie-breaker for ISIS route selection, includes instructions for receiving, at the router, route advertisements within a network. The computer readable medium also includes instructions for determining for a route advertisement if a particular administrative sub-TLV is present in the route advertisement. When the particular administrative sub-TLV is present in the route advertisement then the computer readable medium includes instructions for using metric information in the TLV for the route as a first tie-breaker when selecting between routes. When the particular administrative sub-TLV is not present in the route advertisement then the computer readable medium includes instructions for using internal ISIS Layer 1 (L1) cost as the first tie-breaker when making a route selection.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an external metric as the primary tie-breaker in ISIS route selections as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing provide an external metric as the primary tie-breaker in ISIS route selections as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
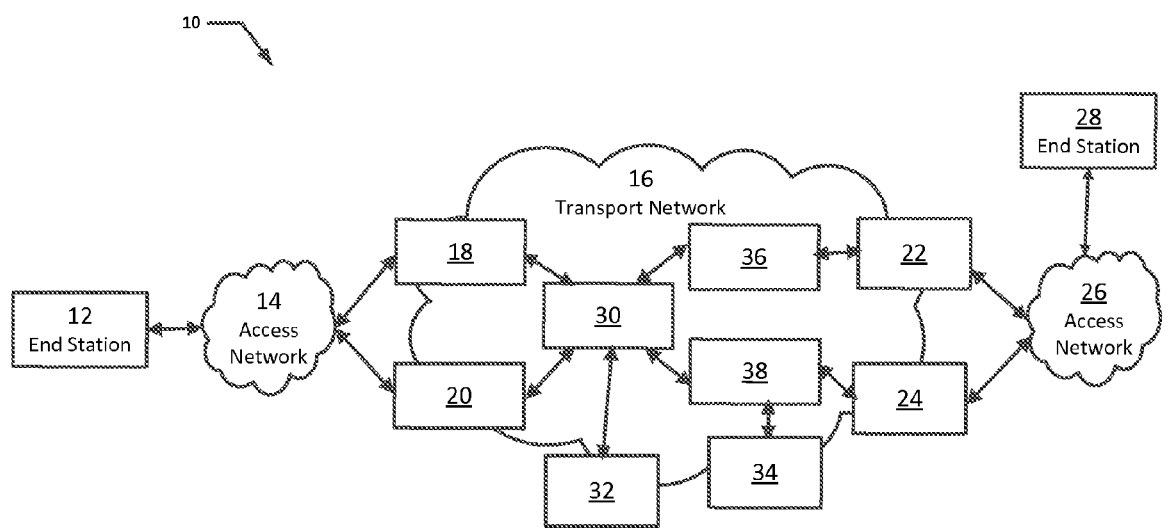
FIG. 1 comprises a block diagram of a network in accordance with embodiments of the invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

A particular embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

FIG. 1 illustrates an environment 10 wherein a first access network 14 and a second access network 28 are interconnected by way of a transport network 16. Transport network 16 in this example is a network that uses ISIS as a protocol to exchange Layer-3 routes. The transport network 16 includes a group of network devices, 18, 20, 22, 24, 30, 32, 34, 36 and 38.

Network devices 18, 20, 22, 24, 32 and 34 are devices capable of running the ISIS protocol and capable of generating and processing ISIS TLVs that are used to advertize Layer-3 routes.

Transport network 16 in this example is running the ISIS protocol. Router 18 is an ISIS router. On router 18, a set of routes that are to be advertised by the router using ISIS are identified as external routes using either explicit and/or default configuration settings (example route-policies and implicit defaults within such policies). In this example the ISIS implementation on the router uses TLV#135 along with either the 32-bit or the 64-bit administrative tag sub-TLV to advertise the routes. Another ISIS router (e.g. router 30) in the network 16 receives the route advertisement. At router 30, if the specific 32/64-bit administrative tag sub-TLV is not present in the route advertisement then the internal ISIS L1 cost is used as the first tie-breaker when making a route selection. On the other hand, if the specific 32/64-bit administrative tag sub-TLV is present in the route advertisement, then the metric information in the route TLV is used as the first tie-breaker.

This allows a network operator to inject routes into ISIS with different external metrics and use the external metric as the first tiebreaker when selecting routes. By controlling the value of the external metric the operator can then achieve the desired route selection behaviors.

It should be noted that while the above description uses TLV#135, the same applies to the use of the 32/64-bit administrative tag Sub-TLVs with TLV#135, TLV#235, TLV#236 or TLV#237.

By controlling the metric on the router advertising the routes, the need to configure route-policies on all the routers in the network is eliminated. Further, unlike the use of the ISIS link metric—this is totally independent of the internal topology of the network and offers much better granular control of the traffic types that are impacted.

Figure 2:
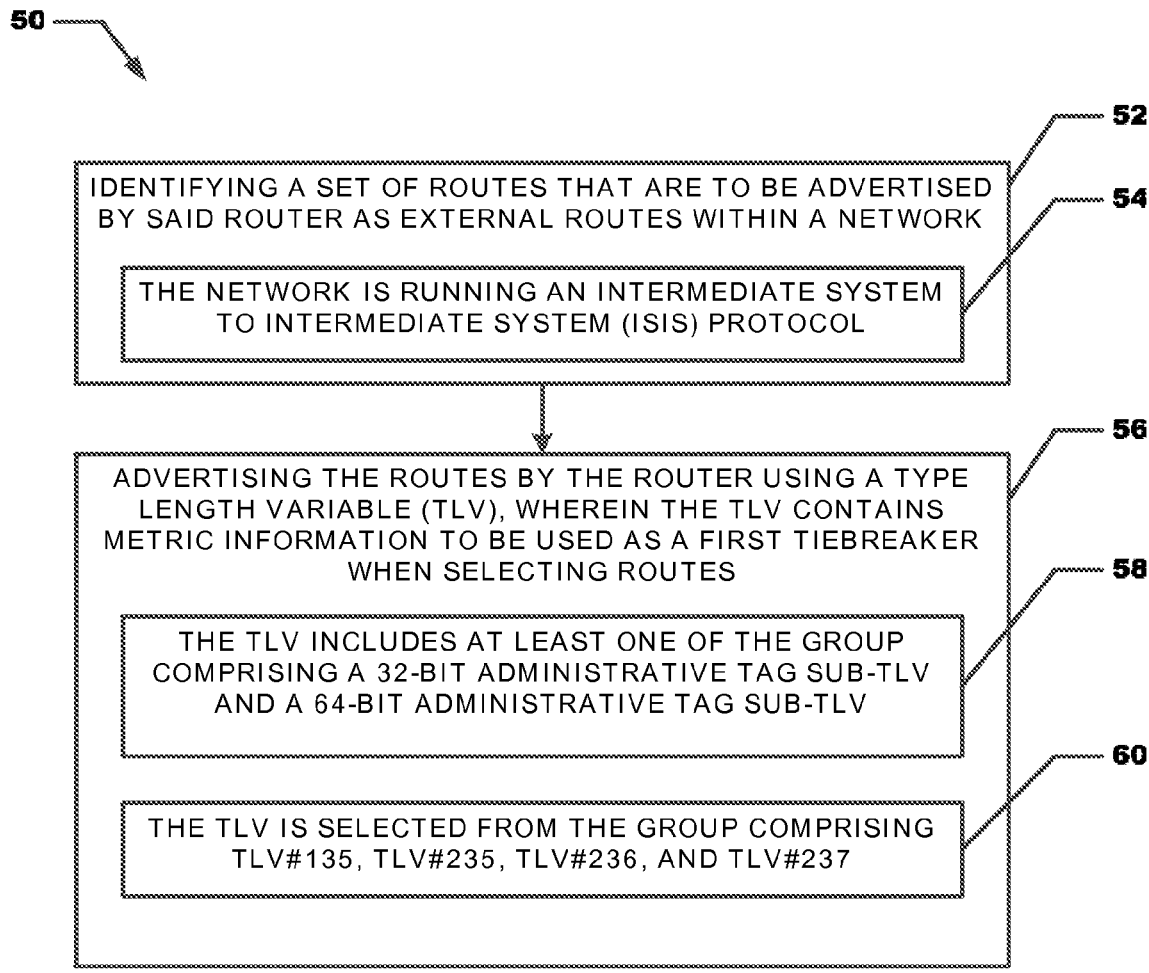
FIG. 2 comprises a flow diagram of a first method for providing use of an external metric as a primary tie-breaker in ISIS route selections in accordance with embodiments of the invention.
Figure 3:
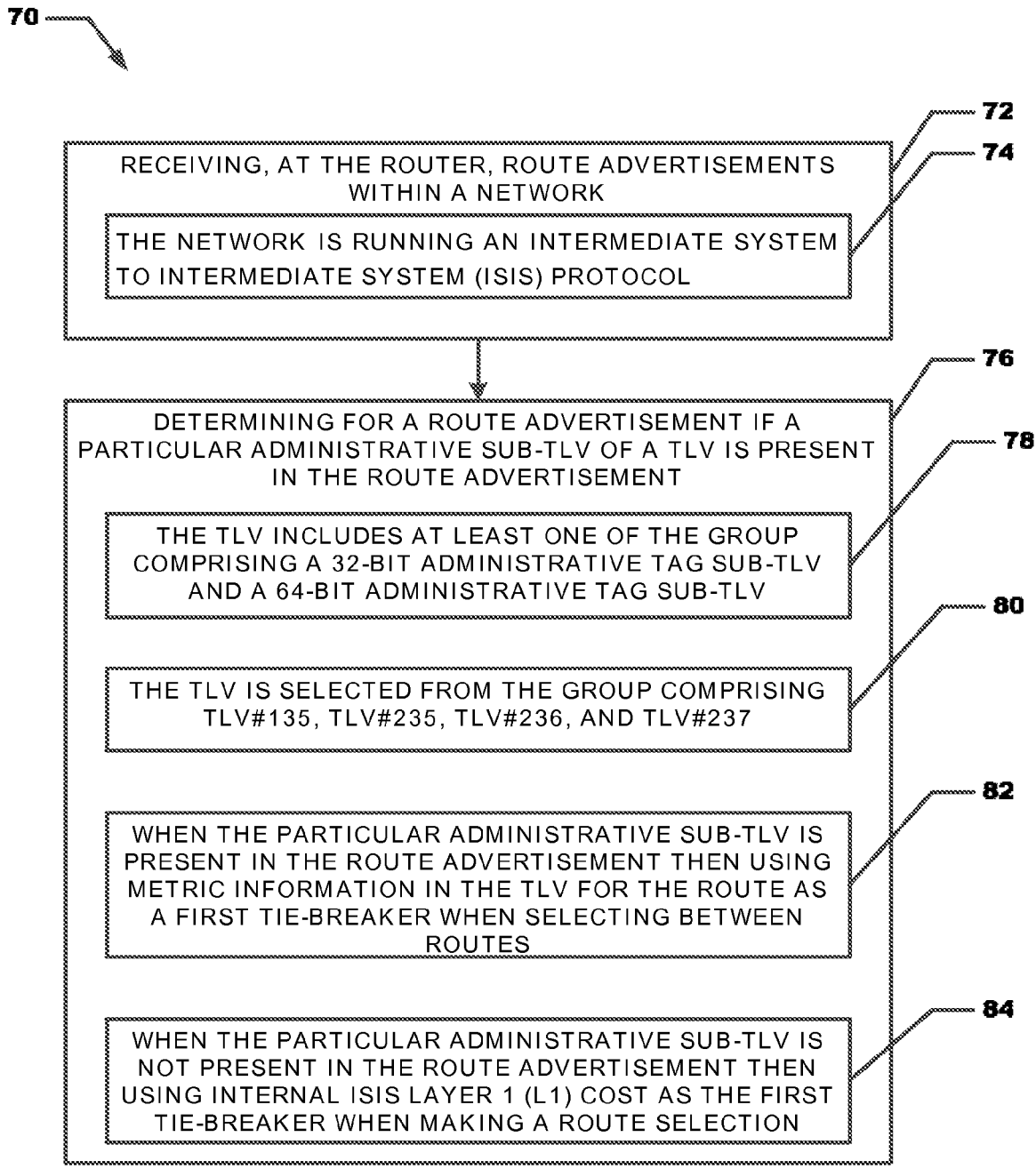
FIG. 3 comprises a flow diagram of a second method for providing use of an external metric as a primary tie-breaker in ISIS route selections in accordance with embodiments of the invention.

Flow diagrams of the presently disclosed methods are depicted in FIGS. 2 and 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a first particular embodiment of a method 50 for providing use of an external metric as the primary tie-breaker in ISIS route selections is shown. Method 50 begins with processing block 52 which discloses identifying a set of routes that are to be advertised by the router as external routes within a network. As shown in processing block 54, the network is running an Intermediate System To Intermediate System (ISIS) protocol.

Processing block 56 states advertising the routes by the router using a Type Length Variable (TLV), wherein the TLV contains metric information to be used as a first tiebreaker when selecting routes. As shown in processing block 58 the TLV includes a at least one of the group comprising a 32-bit administrative tag sub-TLV and a 64-bit administrative tag sub-TLV. As further shown in processing block 60 the TLV is selected from the group comprising TLV#135, TLV#235, TLV#236, and TLV#237.

Referring now to FIG. 3 a second particular embodiment of a method 70 for providing use of an external metric as the primary tie-breaker in ISIS route selections is shown. Method 70 begins with processing block 72 which discloses receiving, at the router, route advertisements within a network. As shown in processing block 74, the network is running an Intermediate System to Intermediate System (ISIS) protocol.

Processing block 76 discloses determining for a route advertisement if a particular administrative sub-TLV is present in the route advertisement. Processing block 78 shows the TLV includes at least one of the group comprising a 32-bit administrative tag sub-TLV and a 64-bit administrative tag sub-TLV. Processing block 80 shows wherein the TLV is selected from the group comprising TLV#135, TLV#235, TLV#236, and TLV#237. Processing block 82 states when the particular administrative sub-TLV is present in the route advertisement then using metric information in the TLV for the route as a first tie-breaker when selecting between routes. Processing block 84 recites when the particular administrative sub-TLV is not present in the route advertisement then using internal ISIS L1 cost as the first tie-breaker when making a route selection.

Figure 4:
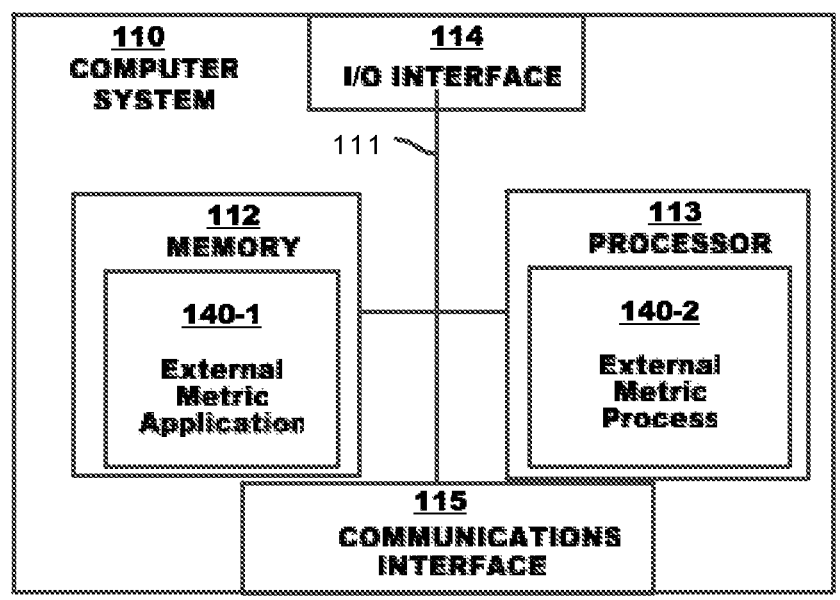
FIG. 4 illustrates an example computer system architecture for a computer system that provides use of an external metric as a primary tie-breaker in ISIS route selections in accordance with embodiments of the invention.

FIG. 4 is a block diagram illustrating example architecture of a computer system 110 that executes, runs, interprets, operates or otherwise performs an external metric operating application 140-1 and external metric operating process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the external metric operating application 140-1 and process 140-2 provides on the display 130. Essentially, the graphical user interface 160 is where the customer 108-1 performs their 'online banking', specifying which bills are to be paid electronically, when those bills are to be paid, and the amount to be paid. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an external metric operating application 140-1 as explained herein. The external metric operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of an external metric operating application 140-1. Execution of a external metric operating application 140-1 in this manner produces processing functionality in the external metric operating process 140-2. In other words, the external metric operating process 140-2 represents one or more portions or runtime instances of an external metric operating application 140-1 (or the entire an external metric operating application 140-1) performing or executing within or upon the processor 113 in the computerized device 110 at runtime.

It is noted that example configurations disclosed herein include the external metric operating application 140-1 itself (i.e., in the form of un-executed or non-performing logic instructions and/or data). The external metric operating application 140-1 may be stored on a computer readable medium (such as a floppy disk), hard disk, electronic, magnetic, optical, or other computer readable medium. A external metric operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a external metric operating application 140-1 in the processor 113 as the external metric operating process 140-2. Those skilled in the art will understand that the computer system 110 may include other processes and/or software and hardware components, such as an operating system not shown in this example.

A display 130 need not be coupled directly to computer system 110. For example, the external metric operating application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the external metric application 140-1. Execution of external metric application 140-1 produces processing functionality in external metric process 140-2. In other words, the external metric process 140-2 represents one or more portions of the external metric application 140-1 (or the entire application) performing within or upon the processor 113 in the computer system 100.

It should be noted that, in addition to the external metric process 140-2, embodiments herein include the external metric application 140-1 itself (i.e., the un-executed or non-performing logic instructions and/or data). The external metric application 140-1 can be stored on a computer readable medium such as a floppy disk, hard disk, or optical medium. The external metric application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of external metric application 140-1 in processor 113 as the external metric process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a router performs operations comprising:
   receiving, at said router, route advertisements within a network;
   determining for a route advertisement if a particular administrative sub-TLV is present in said route advertisement;
   when said particular administrative sub-TLV is present in said route advertisement then using metric information in said TLV for said route as a first tie-breaker when selecting between routes; and
   when said particular administrative sub-TLV is not present in said route advertisement then using internal ISIS Layer 1 (L1) cost as the first tie-breaker when making a route selection.

2. The method of claim 1 wherein said network is running an Intermediate System To Intermediate System (ISIS) protocol.

3. The method of claim 1 wherein said TLV is selected from the group comprising TLV#135, TLV#235, TLV#236, and TLV#237.

4. The method of claim 1 wherein said TLV includes at least one of the group comprising a 32-bit administrative tag sub-TLV and a 64-bit administrative tag sub-TLV.

5. A non-transitory computer readable storage medium having computer readable code thereon for providing use of an external metric as a primary tie-breaker in route selections, the medium including instructions in which a router performs operations comprising:
   receiving, at said router, route advertisements within a network;
   determining for a route advertisement if a particular administrative sub-TLV is present in said route advertisement;
   when said particular administrative sub-TLV is present in said route advertisement then using metric information in said TLV for said route as a first tie-breaker when selecting between routes; and
   when said particular administrative sub-TLV is not present in said route advertisement then using internal ISIS Layer 1 (L1) cost as the first tie-breaker when making a route selection.

6. The computer readable storage medium of claim 5 wherein said network is running an Intermediate System To Intermediate System (ISIS) protocol.

7. The computer readable storage medium of claim 5 wherein said TLV is selected from the group comprising TLV#135, TLV#235, TLV#236, and TLV#237.

8. The computer readable storage medium of claim 5 wherein said TLV includes at least one of the group comprising a 32-bit administrative tag sub-TLV and a 64-bit administrative tag sub-TLV.

9. A router comprising:
   a memory;
   a processor;
   a communications interface;
   an interconnection mechanism coupling the memory, the processor and the communications interface; and
   wherein the memory is encoded with an application providing use of an external metric as a primary tie-breaker in route selections, that when performed on the processor, provides a process for processing information, the process causing the computer system to perform the operations of:
   receiving, at said router, route advertisements within a network;
   determining for a route advertisement if a particular administrative sub-TLV is present in said route advertisement;
   when said particular administrative sub-TLV is present in said route advertisement then using metric information in said TLV for said route as a first tie-breaker when selecting between routes; and
   when said particular administrative sub-TLV is not present in said route advertisement then using internal ISIS Layer 1 (L1) cost as the first tie-breaker when making a route selection.

10. The router of claim 9 wherein said network is running an Intermediate System To Intermediate System (ISIS) protocol.

11. The router of claim 9 wherein said TLV is selected from the group comprising TLV#135, TLV#235, TLV#236, and TLV#237, and wherein said TLV includes at least one of the group comprising a 32-bit administrative tag sub-TLV and a 64-bit administrative tag sub-TLV.

* * * * *